United States Patent
Bechinger et al.

(10) Patent No.: US 6,369,934 B1
(45) Date of Patent: Apr. 9, 2002

(54) SELF BLEACHING PHOTOELECTROCHEMICAL-ELECTROCHROMIC DEVICE

(75) Inventors: Clemens S. Bechinger, Konstanz (DE); Brian A. Gregg, Golden, CO (US)

(73) Assignee: Midwest Research Institute, Kansas City, MO (US)

(*) Notice: Subject to any disclaimer, the term of this patent is extended or adjusted under 35 U.S.C. 154(b) by 93 days.

(21) Appl. No.: 09/631,201

(22) Filed: Aug. 1, 2000

Related U.S. Application Data (63) Continuation-in-part of application No. 08/655,724, filed on May 30, 1996, now abandoned.

(51) Int. Cl.⁷ .............................. G02F 1/15; G09G 3/19
(52) U.S. Cl. ...................... 359/265; 359/272; 359/273; 359/275; 345/49; 345/105; 250/214 SG; 252/586
(58) Field of Search .................... 359/265, 266, 359/270, 272, 273, 275; 345/49, 84, 105, 106; 250/214 SG; 252/586, 582

(56) References Cited

U.S. PATENT DOCUMENTS

| | | | |
|---|---|---|---|
| 3,769,512 A | * 10/1973 | Grenot et al. | ......... 250/214 GS |
| 4,214,916 A | * 7/1980 | Felsher et al. | ......... 250/214 GS |
| 4,768,865 A | * 9/1988 | Greenberg et al. | .......... 359/266 |
| 4,958,917 A | * 9/1990 | Hashimoto et al. | ......... 359/275 |
| 4,983,957 A | * 1/1991 | Ishikawa et al. | ............. 359/265 |
| 5,377,037 A | * 12/1994 | Branz et al. | ................. 359/265 |
| 5,384,653 A | * 1/1995 | Benson et al. | ............... 359/270 |
| 5,604,626 A | * 2/1997 | Teowee et al. | .............. 359/265 |
| 5,694,144 A | * 12/1997 | Lefrou et al. | .................. 345/49 |
| 5,859,722 A | * 1/1999 | Suga et al. | .................. 359/265 |
| 6,122,092 A | * 9/2000 | DuPasquier et al. | ......... 359/272 |

* cited by examiner

Primary Examiner—Loha Ben
(74) Attorney, Agent, or Firm—Paul J. White (57) ABSTRACT

A photoelectrochemical-electrochromic device comprising a first transparent electrode and a second transparent electrode in parallel, spaced relation to each other. The first transparent electrode is electrically connected to the second transparent electrode. An electrochromic material is applied to the first transparent electrode and a nanoporous semiconductor film having a dye adsorbed therein is applied to the second transparent electrode. An electrolyte layer contacts the electrochromic material and the nanoporous semiconductor film. The electrolyte layer has a redox couple whereby upon application of light, the nanoporous semiconductor layer dye absorbs the light and the redox couple oxidizes producing an electric field across the device modulating the effective light transmittance through the device.

15 Claims, 4 Drawing Sheets

SELF BLEACHING PHOTOELECTROCHEMICAL-ELECTROCHROMIC DEVICE

This application is a continuation-in-part application of U.S. patent Ser. No. 08/655,724, filed May 30, 1996, now abandoned.

The United States Government has rights in the invention under Contract DE-AC36-99GO10337 between the United States Department of Energy and the National Renewable Energy Laboratory, a Division of the Midwest Research Institute.

BACKGROUND OF THE INVENTION

1. Field of the Invention

The present invention relates to electrochromic devices which modulate the transmittance of light entering a window depending on the incident solar intensity and, in particular, relates to electrochromic devices which are self-powered to modulate the transmittance of light entering a window without needing external power supplies.

2. Description of the Prior Art

Presently there exists in excess of 19 billion square feet of windows in commercial and residential buildings, and more than 600 million square feet of windows are being installed in new buildings throughout the United States each year, culminating in enormous cost and energy demands for air conditioning to negate the unwanted solar heat gains through these windows. Sometimes, static solar gain control coatings are applied to windows. This practice is disadvantageous, however, in that sunlight is blocked even when it is needed for lighting and heating during cold weather.

There have been some apparatus and methods developed for controlling the transmittance of light through window panes. For example, U.S. Pat. No. 4,768,865, discloses a conventional electrochromics film on a window that is responsive to the application of an electric field to change from a high-transmittance, non-absorbing state to a lower-transmittance, absorbing or reflecting state.

U.S. Pat. No. 4,958,917, discloses the use of an electrochromic coating for dimming automobile windows, including a plurality of solid electrochromic elements arranged in a horizontal abutting fashion and adhered to the glass window, each element being controlled independently of the others.

U.S. Pat. No. 4,958,917, discloses a specialized combination of two electrochromic cells which, together, are capable of reducing the transmittance of visible light to less than the usual lower limit of 7% for known electrochromic coatings.

While U.S. Pat. Nos. 4,768,865, and 4,958,917 patents teach electrochromic coatings or controlling the transmittance of light through window panes, these coatings require external power supplies and, to be practical, the need for wiring into a building's electrical system.

U.S. Pat. No. 4,475,031 discloses a self-contained sun-sensitive window made up of liquid nematic crystals (LC), sandwiched between two transparent sheets and powered directly by a solar cell. Liquid nematic crystals, however, are not effective,in blocking heat radiation. Rather, they merely scatter light, thus making a window translucent, but not effectively blocking heat gain from the sun's rays. A further disadvantage of such liquid nematic crystal technology is that a constant source of energy is required to change the translucence of the window, thus requiring a substantial and continuous source of electric power as long as transparency instead of translucence is desired.

U.S. Pat. No. 5,384,653, assigned to the same assignee as the present application, describes a stand-alone photovoltaic powered electrochromic window. The window of this patent includes an electrochromic material that has been deposited on one pane of the window in conjunction with an array of photovoltaic cells deposited along an edge of the pane to produce the required electric power necessary to vary the effective transmittance of the window. While providing a self-powered electrochromic window, the window of this patent requires increased layers in the electrochromic material in addition to using a portion of the window space for the photovoltaic array along the periphery of the window. Use of only the periphery of the window for the photovoltaic cells could result in the sunlight entering the building without actually contacting the photovoltaic cells.

U.S. Pat. No. 5,377,037, assigned to the same assignee as the present application, describes an electrochromic-photovoltaic film for light-sensitive-control of optical transmittance. The variable transmittance optical component of this patent includes an electrochromic material and a photovoltaic device-type thin film solar cell deposited in a tandem type, monolithic single coating over the component. A resistor is connected in series across the electrochromic material and photovoltaic device controlling the activation and deactivation of the electrochromic material. The electrical conductivity between the electrochromic material and the photovoltaic device is enhanced by interposing a transparent electrically conductive layer.

In U.S. Pat. No. 5,377,037 an electrical connection exists between the electrochromic material and the photovoltaic device. While successfully providing a variable transmittance optical component that does not require an external power supply, the optical component of this patent requires at least eight thin layers to operate and is very complicated to construct due to the thin layers and delicacy of manufacture.

U.S. Pat. No. 5,604,626 of Teowee et al. disclose a user controllable photochromic device (UCPC) having the means for controlling the electrical connection between a first conducting electrode and a second conducting electrode, as shown in FIG. 6 and described in column 14, lines 1–21. The photochromic device of this patent is not spontaneously bleached upon removal of light, but instead uses an external bleach voltage. Teowee et al. does state at column 13, lines 64–67 that, "Of course, an external bleach voltage is optional especially for any devices which may rapidly self bleach when the radiation source is removed."

However, Teowee et al. fails to provide a positive disclosure or teaching of any device design that may rapidly self bleach upon removal of a radiation source, and only positively teach user controllable photochromic (UCPC) devices that specifically rely upon an external power source for user control of both coloration and bleaching (column 14, lines 1–22).

Regardless of the previous attempts to reduce the amount of solar energy entering a window, there remains a need for a self-darkening window coating which modulates the transmittance of incoming light depending on the incident solar intensity without utilizing valuable window space. Furthermore, the need remains for a self-darkening window which modulates depending on the amount of light entering the window and not the amount of light striking the periphery of the window.

There is a need in the art of photochromic devices for a self-powered photoelectro chemical-electrochromic device design that automatically modulates transmittance of incoming light and that spontaneously bleaches upon removal of light without an external power source.

SUMMARY

The present invention is a photoelectrochemical-electrochromic device. The device comprises a first transparent electrode and a second transparent electrode in a parallel, spaced relation to each other. The first transparent electrode is electrically connected to the second transparent electrode.

The device of the present invention further comprises an electrochromic material applied to the first transparent electrode and a semiconductor coating applied to the second transparent electrode. An electrolyte layer contacts the electrochromic materials and the semiconductor coating. The electrolyte layer has a redox couple whereby application of light, the semiconductor coating absorbs the light and the redox couple oxidizes producing an electric field across the device modulating the effective light transmittance through the device.

In a preferred embodiment, the device further comprises a first transparent substrate and a second transparent substrate. The first transparent electrode is applied to the first transparent substrate and the second transparent electrode is applied to the second transparent substrate. Preferably, the first and second transparent substrate comprises a material selected from the group consisting of glass and plastic.

In another embodiment of the device of the present application, the electrochromic material preferably comprises a material selected from the group consisting of $WO_3$, $IrO_x$, $V_2O_5$, and $NiO$ and the semiconductor coating layer preferably comprises a porous material of metal oxide selected from the group consisting of $TiO_2$, CdS, ZnS, ZnO, and $WO_3$. Furthermore, the device of present invention preferably comprises a layer of dye applied on the surface and into the pores of the semiconductor coating layer. The dye preferably comprises transition metal complexes selected from the group consisting of $ML_3$ and $ML_2X_2$ wherein M is selected from the group consisting of Fe, Ru, Os, Cr, Mo and Mn, L comprises bipyridine-type ligand selected from the group consisting of 2,2'-bipyridine-4,4'-dicarboxylic acid and 4,4'-dimethyl-2,2'-bipyridine, and X comprises a monodentate ligand selected from the group consisting of CN, SCN, Cl, Br, I and $H_2O$; poryphyrins comprising zinc tetra (4-carboxyphenyl) porphyrin; phthalocyanines comprising 4,4',4"4'"-tetraazaphthalocyanine; and perylenes comprising 3,4,9,10-perylene tetracarboxylic acid.

In yet another preferred embodiment, the electrolyte layer has a predetermined thickness to provide high lateral ionic conductivity to darken the entire immediately adjacent electrochromic material. When the electrolyte layer's thickness is less than the predetermined thickness, high lateral conductivity does not occur and only those portions of the electrochromic material adjacent the electrolyte exposed to the light will actually darken.

The present invention is also a method of modulating the transmittance of light. The method comprises electrically connecting a first transparent electrode and a second transparent electrode in parallel, spaced relation to each other. Next, an electrochromic material is applied to the first transparent electrode and a semiconductor coating is applied to the second transparent electrode. Then, an electrolyte layer is positioned to contact the electrochromic material and the semiconductor coating. The electrolyte layer has a redox couple, whereby the first and second electrodes, the electrochromic material, the semiconductor coating, and the electrolyte layer form a photoelectrochemical-electrochromic device. Finally, the photoelectrochemical-electrochromic device is exposed to a light source wherein the semiconductor coating and/or the sensitizing dye absorbs the light and the redox couple becomes oxidized producing an electric field across the photoelectrochemical-electrochromic device to vary the effective light transmittance through the photoelectrochemical-electrochromic device.

In a preferred embodiment, the method further comprises applying the first transparent electrode to the first transparent substrate and applying the second transparent electrode to the second transparent substrate. Also, preferably, the light absorbing and transferring means comprises a dye substance, e.g., a monomolecular chromophore dye applied to the semiconductor layer. In yet another embodiment, the electrolyte layer has predetermined thickness to provide high lateral ionic conductivity.

BRIEF DESCRIPTION OF THE DRAWINGS

The accompanying drawings, which are incorporated in:and form a part of the specification, illustrate the preferred embodiments of the present invention, and together with the description serve to explain the principles of the invention.

DETAILED DESCRIPTION OF THE PREFERRED EMBODIMENTS

The present invention is a photoelectrochemical-electrochromic light modulating assembly, indicated generally at 10, providing a self-powered electrochromic device which automatically or selectively modulates the transmittance of incoming light through a window without the need for an external power source. Basically, as will be described further below, the modulating assembly 10 of the present invention combines an electrochromic coating with a semiconductor/electrolyte-type device providing the self-powered modulating assembly 10 of the present invention which reduces the actual number of layers typically needed for operation of an electrochromic coating compared to the prior art.

Figure 1:
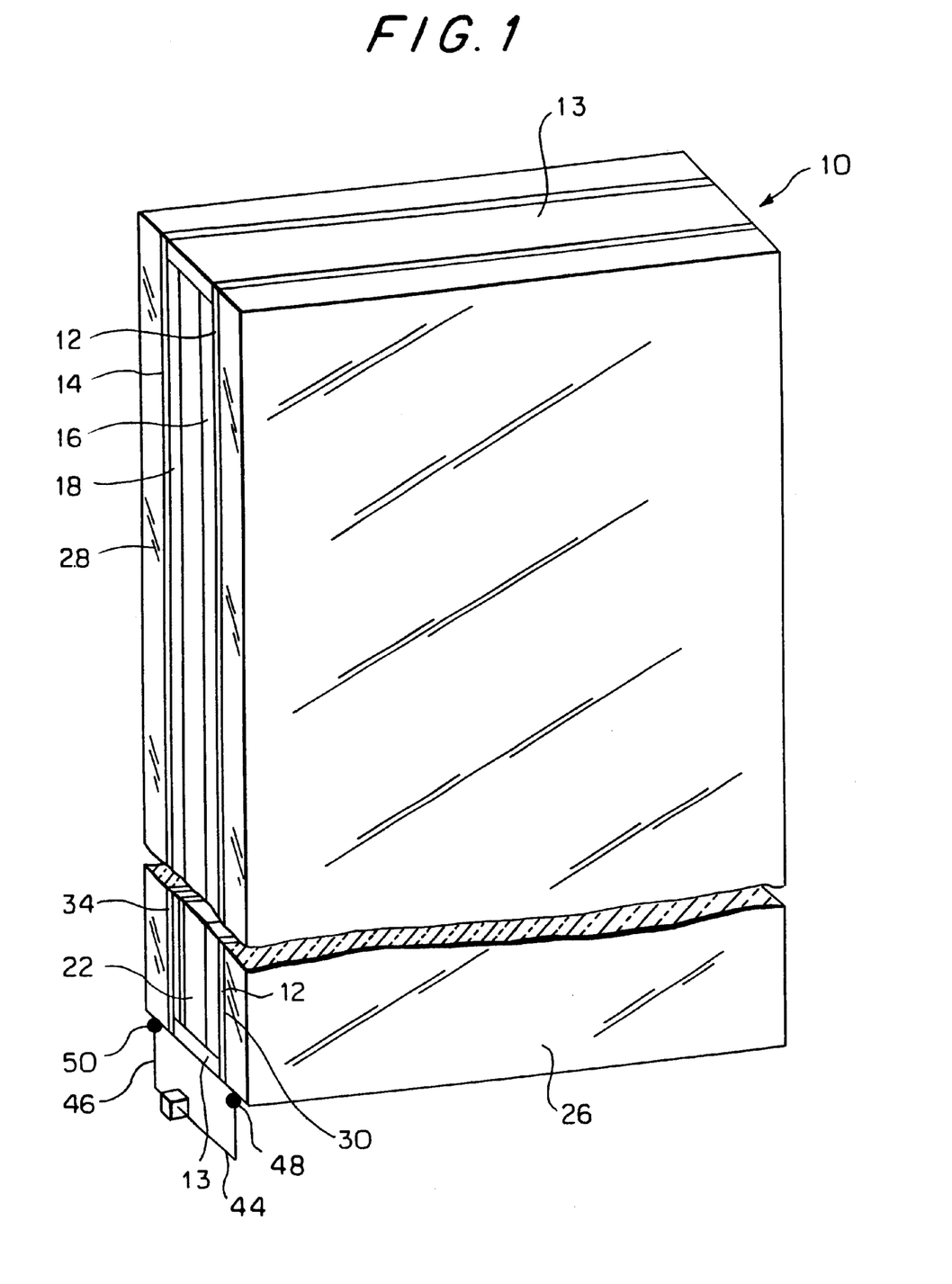
FIG. 1 illustrates a perspective view of a window incorporating the photoelectrochemical-electrochromic device of the present invention.
Figure 2:
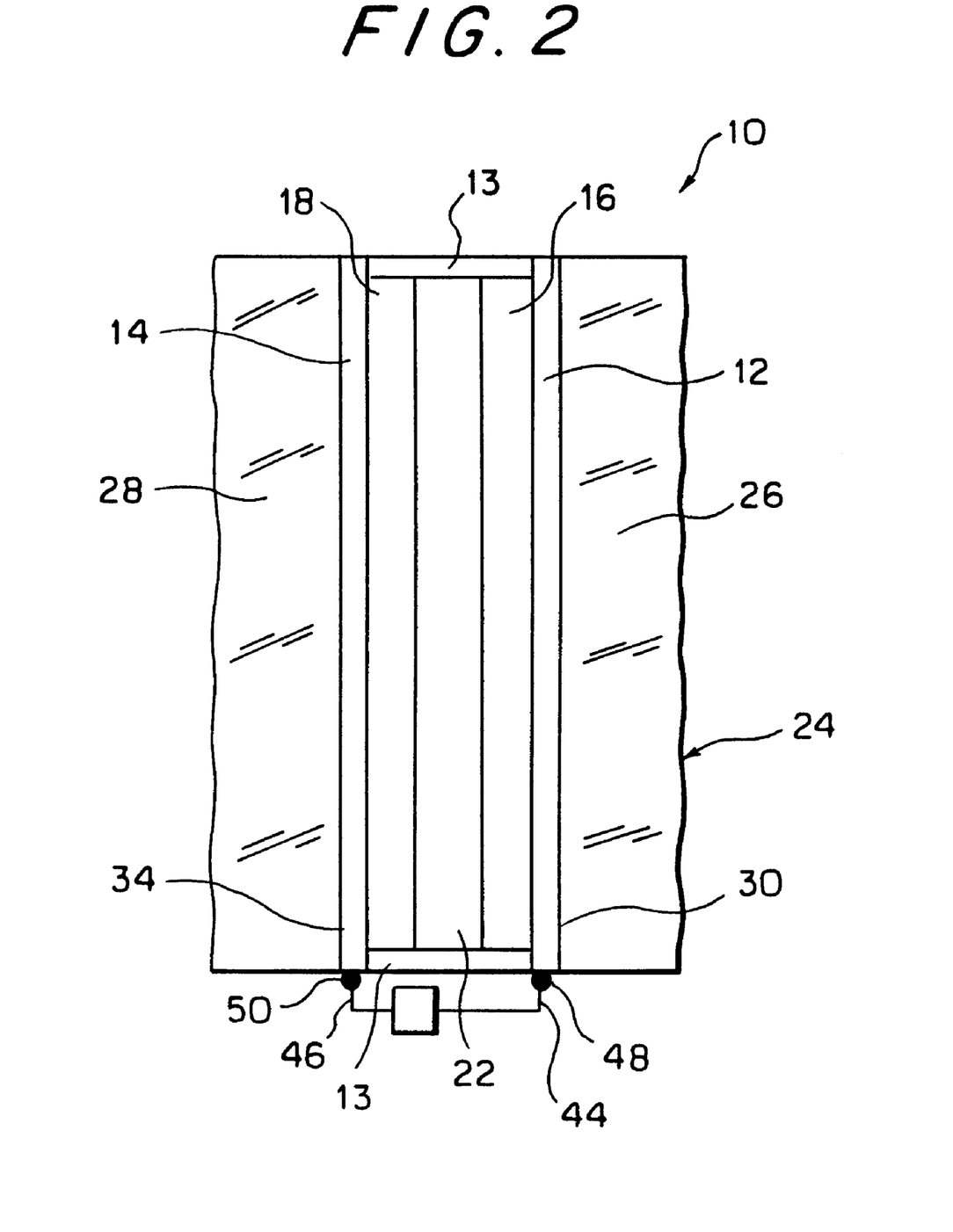
FIG. 2 illustrates a diagrammatic cross sectional view of the photoelectrochemical-electrochromic device which constitutes the present invention.
Figure 4:
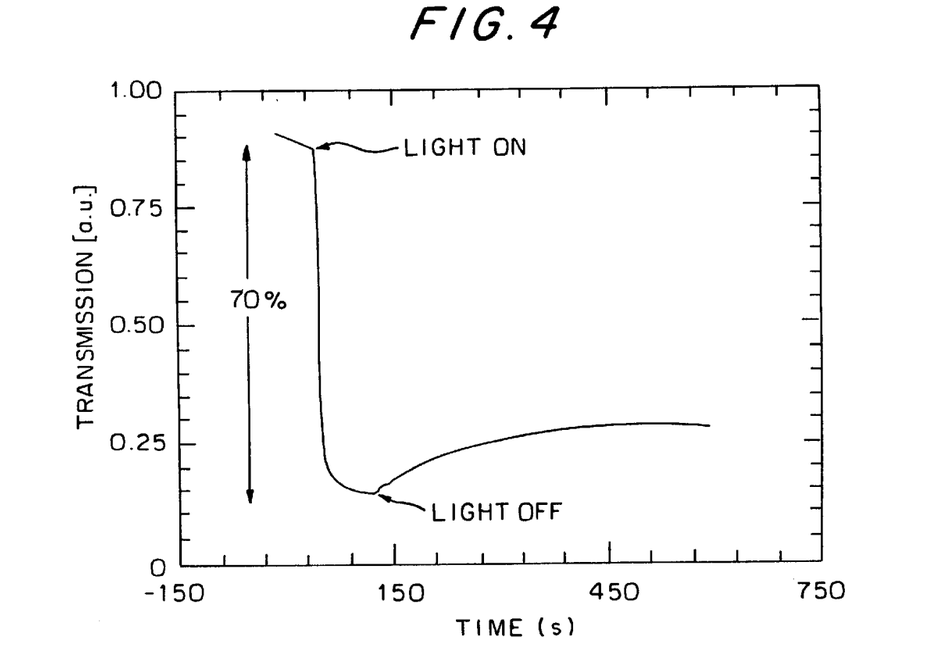
FIG. 4 illustrates the transmission of light through the photoelectrochemical-electrochromic device of the present invention versus time. The graph illustrated in FIG. 4 is derived from the experimentations by the inventors of the present invention during the invention and reduction to practice of the present invention. The electrodes, electrochromic material, semiconductor coating, dye substance and electrolyte layer illustrated are representative of the types of materials available for use. Other materials, including the materials set forth below, are within the scope of the present invention.

As illustrated in FIGS. 1 and 2, as an initial overview, in the present invention, the modulating assembly 10 comprises a first and second transparent electrode 12, 14. The first transparent electrode 12 is coated with an electrochromic material 16 and the second transparent electrode 14 is coated with a semiconductor coating 18 having an optional monomolecular layer of dye substance 20 applied thereon. The first and second transparent electrodes 12, 14 are spaced apart, joined together, and electrically connected. Then, an electrolyte 22, such as lithium iodide (LiI) in propylene carbonate, is inserted between the first and second transparent electrodes 12, 14. As illustrated in FIG. 4, when the modulating assembly 10 is exposed to white light source (approximately equal to one sum)(not shown), the transmittance of the light through the modulating assembly 10 is decreased within one minute by more than 70%. Each component of the modulating assembly 10 of the present invention will now be described in further detail.

Referring to FIG. 2, preferably, the modulating assembly 10 further comprises a window 24 having a first glass plate 26 and a second glass plate 28, each having peripheral edges 40. The first glass plate 26 has an inner and an outer surface 30, 32 and the second glass plate 28 has an inner and outer surface 34,36. The first and second plates 26,28 are placed in a substantially parallel and spaced-apart relation to one another, separated by at least one spacer 38 and sealed around the peripheral edges 40 of the first and second plates 26, 28 to form a cavity 42 between the first and second plates 26, 28. While the modulating assembly 10 of the present invention will be described as having two plates, a first and a second plate, 26, 28, it is within the scope of the present invention to have additional plates, as needed. Furthermore, in the present invention, while the first and second plates 26, 28 preferably comprise glass, any other transparent electrically insulating material including, but not limited to, plastic is within the scope of the present invention.

As illustrated in FIG. 2, the first transparent electrode 12 is deposited on the inner surface 30 of the first plate 26 and the second transparent electrode 14 is deposited on the inner surface 34 of the second plate 28 by known means including, but not limited to, physical vapor deposition, sputtering, chemical vapor deposition, i.e., heat stimulated or radio frequency discharge or the like. The first and second transparent electrodes 12, 14 preferably comprise highly doped metal oxides such as $SnO_2$:F, $SnO_2$:Sb, $In_2O_3$:Sn (ITO), $Cd_2SnO_4$, ZnO:Al and ZnO:In. Particularly suitable metal oxide semiconductors are oxides of the transition metals, and of elements of the third main group and of the fourth, fifth and sixth secondary groups (of the periodic system of elements) of titanium, zirconium, hafnium, strontium, zinc, indium, yttrium, lanthanum, vanadium, niobium, tantalum, chromium, molybdenum, tungsten, or alternatively oxides of zinc, iron, nickel or silver, perovskites such as $SrTiO_3$, $CaTiO_3$ or oxides of other metals of the second and third main groups or mixed oxides or oxide mixtures of these metals. Alternatively, any other conductive metal oxides or metal sulfides with semiconductor properties and a large energy gap (band gap) between the valence band and the conduction band can be used.

It is important that the first and second transparent electrodes 12,14 be effectively transparent to the light so that the light can reach the nanoporous semiconductor coating or layer 18 having dye adsorbed therein for conversion to electrical energy. Furthermore, preferably, the first and second transparent electrodes 12, 14 are each between approximately 1000 to approximately 5000 angstroms thick.

As illustrated in FIG. 2, the electrochromic material 16 is deposited on the first transparent electrode 12 similar to the deposition of the first transparent electrode 12 on the first glass plate 26. In general, an electrochromic material is one that takes on and loses color, i.e., becomes opaque or transparent, in response to an electric field or current therethrough in the presence of an ion source adjacent to the electrochromic material, as will be discussed further below. The electrochromic material 16 can be anodic or cathodic in nature and can occur in two phases, liquids and solids. The electrochromic material 16 colors in a reduced state (which can be induced by a DC electric current) and includes, but is not limited to, $WO_3$, $IrO_x$, NiO, $V_2O_5$, $MoO_3$, $TiO_2$, $U_2O_5$, $Bi_2O_3$, $PbO_2$, and $CuO_x$.

The invention discovery is that, if the semiconductor layer of $TiO_2$ is not a nanoporous semiconductor with a light absorbing dye adsorbed therein, the $TiO_2$ becomes photoexcited and destroys the organic compounds or solvents (propylene carbonate, etc.) thereby creating a chemically irreversible reaction that prevents spontaneous bleaching of the electrochromic material upon removal of light. However, if an outside power source such as, that disclosed in U.S. Pat. No. 5,604,626 is utilized, the destruction of the organic solvent by the photoexcited $TiO_2$ would not prevent the outside power source from inducing non-spontaneous bleaching.

In the invention self-powered photoelectrochemical-electrochromic device; the nanoporous semiconductor of $TiO_2$ having a light absorbing dye adsorbed therein prevents illumination of the $TiO_2$, and allows only the dye to be illuminated. As such, the illuminated oxidized dye does not destroy the organic compound and allows chemically reversible oxidation on the iodide ion of the LiI.

The electrochromic material 16 of the present invention is preferably between approximately 1,000 to approximately 15,000 angstroms thick.

As stated above and illustrated in FIG. 2, the second transparent electrode 14 is coated with a semiconductor coating 18, which is a nanoporous specimen of $TiO_2$, with an oxidizable sensitizer or chromophore (dye) adsorbed therein, for example $RuL_3^{4-}$, is used for operation of the device 10 (operation of the device 10 of the present invention will be described further below). Preferably, the nanoporous $TiO_2$ films of the invention are prepared by either method 1 or by method 2 as described in Nazeeruddin et al (*J. Am Chem. Soc.,* 1993, 115, 6382). Both methods produce satisfactory semiconductor films but method 1 produce films having better transparency.

In the case of the nanoporous specimen of the $TiO_2$ semiconductor 18, when the dye substance is applied, the dye substance is adsorbed into the pores of the semiconductor coating 18. It should be noted that different dye substances have different spectral sensitivities. The dye substance can thus be adapted to absorb light in a desired spectral region while transmitting light in other spectral regions. Examples of suitable dye substances are, i.e., sensitizers, are complexes of transition metals of the type selected from the group consisting of $ML_3$ and $ML_2X_2$ wherein M is selected from the group consisting of Fe, Ru, Os, Cr, Mo and Mn, L comprises bipyridine-type ligand selected from the group consisting of 2,2'-bipyridine-4,4'-dicarboxylic acid and 4,4'-dimethyl-2,2'-bipyridine, and X comprises a monodentate ligand selected from the group consisting of CN, SCN, Cl, Br, I and $H_2O$; poryphyrins comprising zinc tetra(4-carboxyphenyl) porphyrin; phthalocyanines comprising 4,44',4'',4'''-tetraazaphthalocyanine; and perylenes comprising 3,4,9,10-perylene tetracarboxylic acid. The dye substance can be chemi-sorbed or adsorbed into the pores of the semiconductor 18 of the modulating assembly 10 of the present invention. It should be noted that the elements listed above for M, L, and X are merely representative of the types of elements available for use with the device of the present invention. Other elements are within the scope of the present invention.

The actual deposition of the electrochromic material 16 and the semiconductor coating 18 can be accomplished by evaporation techniques. Furthermore, the electrochromic material 16 and the semiconductor coating 18 can be deposited on the first and second transparent electrodes 12, 14, respectively, by dip coating, spray coating, spin coating, roll coating, or electroplating. The advantages of utilizing one of the above methods for application rather than by conventional vacuum techniques is the reduced cost factor in equipment and size when dealing with large sheets of material which are found, for example, in large windows for buildings and other uses.

Next, as illustrated in FIG. 2, thin strips 13 of SURLYN brand adhesive strips are placed around the periphery of the first transparent electrode 12. The second transparent electrode 14 is then positioned and pressed against the thin strips 13 thereby forming a cavity 42 between the first and second transparent electrodes 12, 14. The lithium iodide (LiI) containing electrolyte 22 is then inserted between the first and second transparent electrodes 12, 14, e.g., through small holes (not shown) formed in the first plate 26 and/or the second plate 28, such that the electrolyte 22 contacts the electrochromic material 16 and the semiconductor coating. 18. Upon filling of the cavity 42, the small holes are then sealed with an epoxy or medium (not shown).

The electrolyte 22 is designed to store ions and shuttle the ions back and forth into the electrochromic material 16 with applied potential. The first transparent electrode 12 operates as an electron delivery system to transfer electrons into the electrochromic material 16 upon application of the potential produced upon light exposure. Therefore, to operate properly, the electrochromic material 16 requires the ion delivery and storage electrolyte 22 to be contacting the electrochromic material 16. The electrolyte can be either liquid or solid. Solid thin-film electrolytes are made of fast-ion conductor materials in which lithium, sodium or hydrogen ions diffuse readily. In the preferred embodiment, the electrolyte 22 includes Li, which will be described further below. Examples of other materials which are within the scope of the present invention include $Li_3N$, $Li_2NH$, and $Li_{1-x}M_xTi_{2-x\,(PO4)}{}_3$, where M represents another metal, such as aluminum, chromium, gallium, or the like. A solid thin-film electrolyte may be, for example, 500 to 10,000 angstroms thick.

Figure 3:
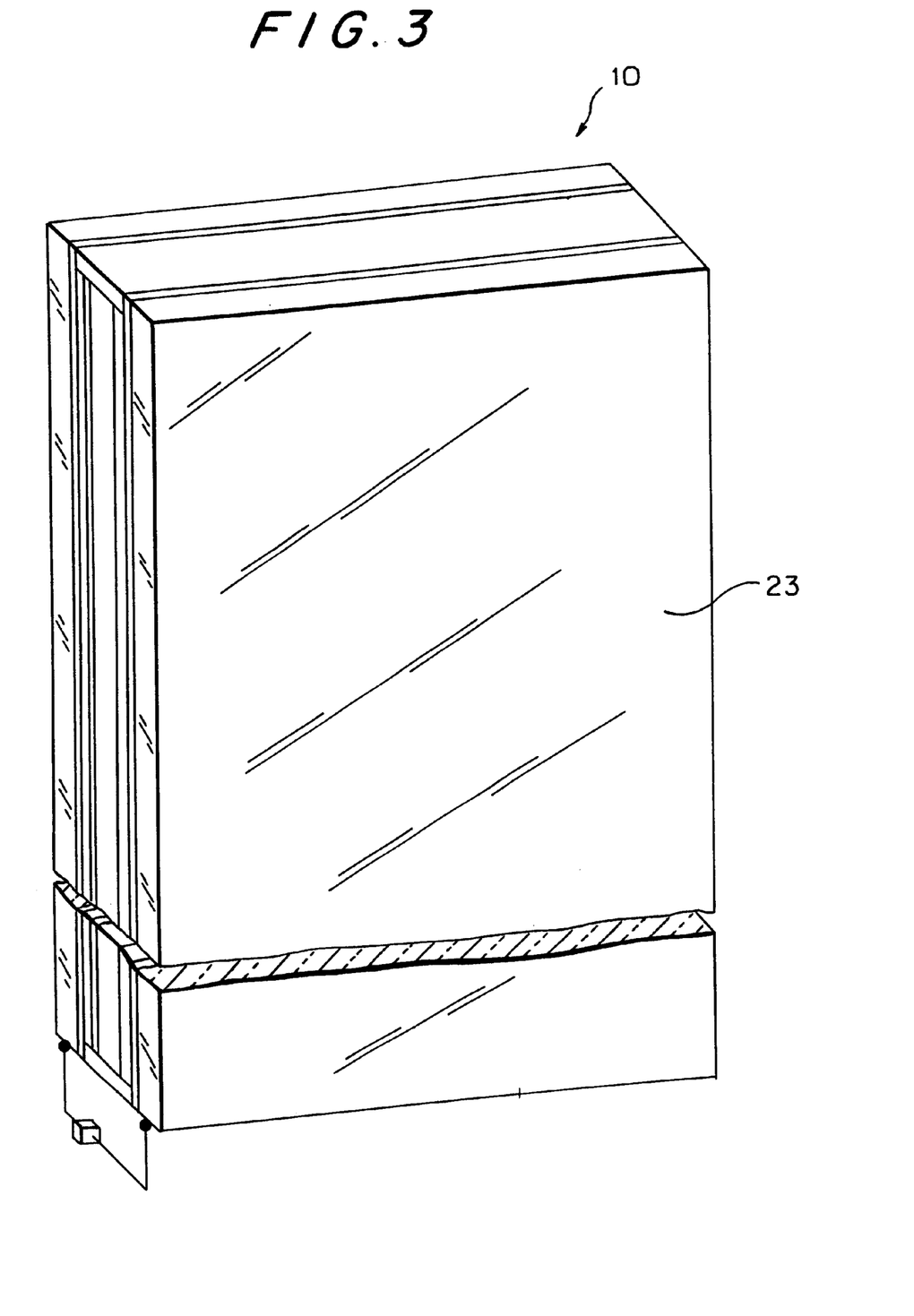
FIG. 3 illustrates a: perspective view of a window incorporating the present invention wherein the electrolyte layer of the photoelectrochemical-electrochromic device comprises a thickness which provides low lateral conductivity.

In order to darken the entire electrochromic material 16 of the modulating assembly 10 when light strikes any portion of the electrolyte 22 therein, the thickness of the electrolyte 22 must exceed a certain predetermined thickness to provide a high lateral ionic conductivity to darken the entire immediately adjacent electrochromic material 16. If the thickness of the electrolyte 22 is less than the predetermined thickness, then only those portions of the electrolyte 22, which have light applied thereto, will actually darken the immediately adjacent electrochromic material 16. As illustrated in FIG. 3, a thinner electrolyte layer 22 allows the modulating assembly 10 of the present invention to be used for storing images by writing on the modulating assembly 10 with a laser or other light generating device (not shown). Furthermore, a thinner electrolyte layer 22 provides the modulating assembly 10 to be utilized as an imaging storage device. Images 23 can be applied to the modulating assembly 10 by an imaging projection device or similar equipment (not shown), stored thereon and then erased when desired. With the use of LiI as the electrolyte 22 in the modulating assembly 10 of the present invention, the thickness must be greater than approximately 0.5 mm to cause high lateral ionic conductivity.

As illustrated in FIG. 2, a first lead 44 and a second lead 46 are connected to a first terminal 48 and a second terminal 50, respectively, on the first transparent electrode 12 and the second transparent electrode 14, respectively, to provide the electrical circuit across the modulating assembly 10. With the first and second leads 44, 46 connected to the first and second terminals 48, 50, and connected to each other, the electric potential across the electrochromic material 16 upon application of light causes the electrochromic material 16 to convert from essentially transparent to opaque. With the first and second leads 44, 46 disconnected, coloration of the electrochromic material 16 will not occur.

With the electric potential reversed, such as by attaching a battery to the first and second leads 44, 46, or by connecting the leads to each other in the absence of illumination, the electrochromic material will lighten back to its original state. Furthermore, a variable resistor element can be inserted between the first and second leads 44, 46 in order to change the dynamics of the modulating assembly 10. The variable resistor controls the amount of potential across the first and second leads 44, 46 such that electrochromic material 16 can be made more or less dark or overridden altogether.

In the present invention, light absorption by the semiconductor coating 18 by the sensitizing dye substance results in electrons appearing in the second electrode 14 and the oxidation of the redox couple in the electrolyte 22 such as iodide to iodine. When the electrode leads 44 and 46 are connected to each other, electrons flow from the second electrode 14 to the first electrode 12 and then into the electrochromic layer 16. Another species in the electrolyte 22, such as lithium, also enters the electrochromic layer 16 causing a decrease in light transmission through the electrochromic layer 16.

In operation, as the sun or other light source shines through the window 24, a chemical reaction takes place in the modulating assembly 10. As the sun contacts the dye substance, the dye substance absorbs the photons from the sun and electrons are injected from the dye substance into the non-photoexcited semiconductor coating 18. A potential travels through the second transparent electrode 14 and into the first transparent electrode 12 through the first and second leads 44, 46. The first transparent electrode 12 injects electrons into the electrochromic material 16. As the charged dye substance oxidizes the electrolyte 22, the electrolyte 22 injects ions into the electrochromic material 16. Injection of ions and electrons into the electrochromic material 16 causes the electrochromic material 16 to darken. Removal of the sun causes a reverse chemical reaction to cause the electrochromic material 16 to automatically lighten.

EXAMPLES

In the examples below, all $TiO_2$ films were prepared on 10 Ω/square tin oxide-coated glass from Libby Owens Ford. The $WO_3$ films were prepared on 12 Ω/square indium tin oxide-coated glass. For purposes of the examples, a photoelectrochemical-electrochromic device was constructed according to the teachings of the present application.

Example 1

Tris(4,4'-dicarboxy-2,2'-bipyridine)ruthenium (II) was adsorbed from ethanol solution onto an approximately 4 μm thick nanoporous TiO$_2$ film by soaking overnight. The dye-sensitized electrode was then rinsed with ethanol and dried in a nitrogen stream. The WO$_3$ electrode was prepared by thermal evaporation of 500 nm of WO$_3$ onto In$_2$O$_3$-coated glass. The two electrodes were clamped together separated by a gasket made of TYGON tubing with a hole cut therethrough. A solution of LiI in acetonitrile was injected through the gasket to fill the internal space. Upon illumination with white light from a 75 W Xe arc lamp, the cell generated an open circuit photovoltage of 0.25V. This was not sufficient to color the WO$_3$ electrode by itself, but decreased the externally applied voltage necessary to color the cell.

Example 2

Bis(4,4'-dicarboxy-2,2'-bipyridine)-bis(thiocyanate) ruthenium (II) was adsorbed onto a TiO$_2$ film as In Example 1. A cell constructed in the same fashion as in Example 1 gave a photovoltage of 0.5 V. This lead to the coloration of the WO$_3$ electrode at short circuit resulting in a change of transmittance of approximately 40% over 100 seconds. The spontaneous bleaching process upon removal of the light was slower, recovering about 20% of its original transparency in 2.5 minutes. Addition of I$_2$ solution to the original LiI electrolyte decreased the photovoltage to 0.45V but did not increase the bleaching rate. After about 10 minutes of illumination, the open circuit voltage of the cell was approximately 0 V, consistent with the WO$_3$ electrode being charged up to a voltage equal and opposite to the dye-sensitized TiO$_2$ electrode. When the light was blocked, the cell voltage was 0.45 V of the opposite polarity as the original photovoltage, consistent with the discharging of the colored WO$_3$ electrode.

Example 3

A solid polymer electrolyte was made (similar to that described by Zhang et al, J. Electrochem. Soc. 1994, 141, 2795) by dissolving 2 g poly (methylmethacrylate) MW=120,000) in 10 mL ethyl acetate, and then mixing in 10 mL of 0.5 M LiI in propylene carbonate. A few drops of this solution were placed on the TiO$_2$ film and the WO$_3$ electrode was pressed on top. The cell was baked at 80° C. for four hours. Exposing this cell to white light resulted in a 7% decrease in transmittance over 10 minutes.

Example 4

A solid polymer electrolyte was obtained by combining 430 poly(ethylene glycol) monomethylether (MW=2000) with 47.3 mg LiI. These were heated together above the melting point of the polymer until much of the LiI had dissolved. Then a piece of this polymer was placed onto a heated dye-sensitized TiO$_2$ electrode prepared as in Example 2. When the polymer electrolyte had melted, a WO$_3$ electrode was pressed tightly on top and the cell was cooled to room temperature. The polymer electrolyte also acted as an adhesive to bond the two electrodes together. Upon illumination with white light, the cell transmittance decreased 23% over eight minutes.

Example 5

A cell was constructed as in Example 2 but using 0.1 M LiI in propylene carbonate containing several drops of 4-tert-butylpyridine as the electrolyte. The transmission decreased 66% over 1.5 minutes exposure to white light.

Example 6

A nanoporous TiO$_2$ film without any sensitizing dye was used as the semiconductor electrode in a cell made up as in Example 5. This cell developed an open circuit photovoltage of 600 mV when illuminated with white light. The transmission decreased by 35% over 12 minutes. A filter cutting out only the UV light eliminated the photoeffect in this cell consistent with a photoeffect resulting from direct excitation of the TiO$_2$.

Example 7

A TiO$_2$ coated electrode was soaked overnight in an ethanol solution containing 138 μM bis(4,4'-dicarboxy-2,2'-bipyridine)(4,4'-dimethyl-2,2'bipyridine)ruthenium (II) and 25 mM chenodeoxycholic acid. A cell made from this electrode following the procedure of Example 5 showed a photovoltage of 680 mV upon exposure to white light and a change in transmission of about 70% as shown in FIG. 4.

Example 8

Figure 5:
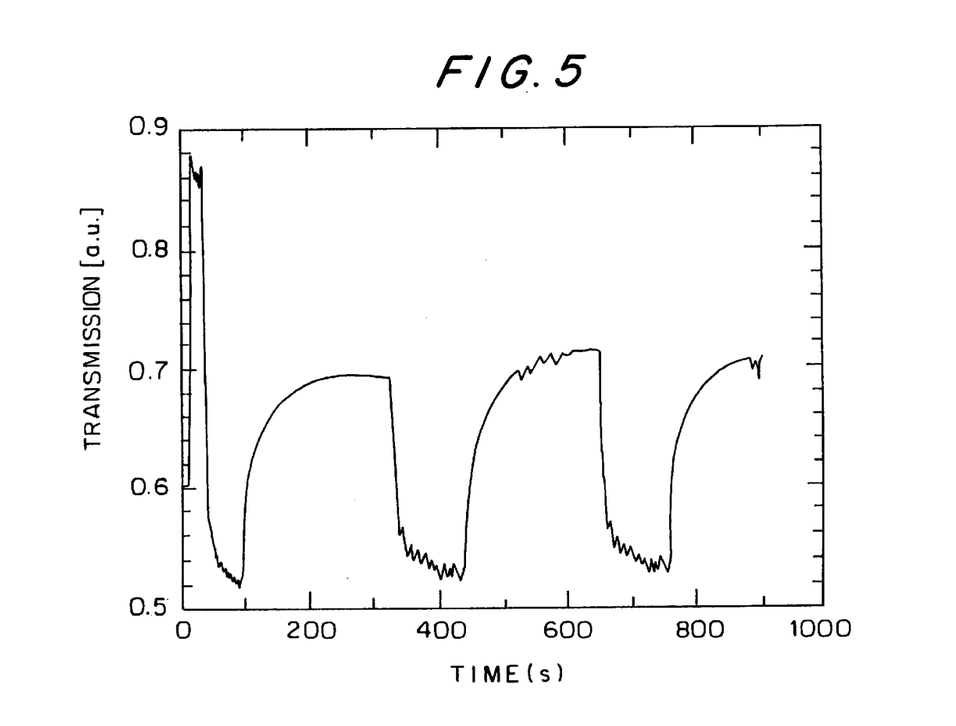
FIG. 5 illustrates a graph of the relative transmittance of light through the photoelectrochemical-electrochromic device of the present invention.

A TiO$_2$ coated electrode was soaked overnight in an ethanol solution containing 69 μM bis(4,4'-dicarboxy-2,2'-bipyridine)(4,4'-dimethyl-2,2'-bipyridine)ruthenium (II) and 12.5 mM chenodeoxycholic acid. A cell made from this electrode following the procedure of Example 5 showed a photovoltage of 580 mV upon exposure to white light and a change in transmission of about 30% within 100 seconds. After blocking the white light with a shutter, spontaneous bleaching occurred leading back to the transparent state after about 200 seconds as shown in FIG. 5.

Example 9

A 5 cm×5 cm dye-sensitized TiO$_2$ film was prepared by soaking overnight in an ethanol solution containing 8.3 μM bis(4,4'-dicarboxy-2,2'-bipyridine)(4,4'-dimethyl-2,2'-bipyridine)ruthenium (II) and 29 mM chenodeoxycholic acid. The WO$_3$ electrode was prepared by thermal evaporation of 500 nm of WO$_3$ onto indium tin oxide-coated glass at a temperature of 50° C. The TiO$_2$ and the WO$_3$ electrodes were sealed together using SURLYN 1601 strips with a thickness of about 30 microns. The strips were arranged around the edges of one electrode. The other electrode was placed on top of the first and the whole cell was heated to about 100° C. to melt the SURLYN and seal the cell. The cell was then filled with the electrolyte of Example 5 through small holes drilled through the WO$_3$ substrates. The fill holes were later sealed with epoxy cement. The open circuit voltage upon exposure to white light was around 880 mV. In the bleached state the white light transmission was about 80%. The transmission upon exposure to white light decreased by about 40%. Shading a part of the TiO during light exposure results in a pattern on the device. The blue coloration is obtained only where the dye-sensitized electrode was directly illuminated, the other parts stayed in the transparent state. The partial coloration can be preserved for more than 24 hours if the cell is stored with open-circuited electrodes.

Example 10

An electrolyte solution was made up containing 0.1 M LiClO$_4$ and 0.1 M tetrabutylammonium bromide in propylene carbonate with about 1% 4-tert-butylpyridine. This was filled into a cell made up as in Example 9 but using a TYGON gasket instead of SURLYN. This cell developed an open circuit photovoltage of about 230 mV.

END OF EXAMPLES

Spontaneous backreaction, i.e., bleaching, of the electrochromic material 16 occurs when the light source is no longer available to reach the modulating assembly 10. Since only a small current is required to change the light transmission of the modulating assembly 10, an external battery can be also charged during operation and used to speed up the bleaching process.

When the electrochromic material 16 is in the substantially transparent state, radiation from the sun is substantially transmitted through the first and second plates 26, 28 of the window 24 into the interior of the building. Of course, some amount of the radiation is always reflected and some is absorbed by the first and second plates 26, 28, but, with the electrochromic material 16 in the substantially transparent state, most of the radiation in the near infrared and visible light portions of the spectrum is admitted into the interior of the building. Inside the building, the sun's radiation, of course, provides light and is eventually absorbed by interior walls, floors, furnishings, and the like, where the electromagnetic radiation is converted to heat energy. In certain ambient weather conditions, the sun's radiation is not desired and often has to be dissipated or removed by ventilation, air conditioning, or the like to maintain the interior of the building at temperatures that are comfortable to humans.

The modulating assembly 10 of the present-invention is effective in substantially decreasing such undesirable heat gain inside a building from the sun's radiation by a combination of features and without the need for an external power source. The electrochromic material 16 on the inner surface 30 of the first plate 26 of the window 24 changes to a substantially opaque state, thus blocking rather than transmitting the sun's radiation. With most of the sun's radiation blocked in this manner, the sun's radiation does not reach the interior of the building to be absorbed and converted to interior heat.

Of course, as mentioned above, when heat gain in the building is desired, the electrochromic material 16 can be changed back to its substantially transparent state to admit the sun's radiation into the building. The extent of opacity or transparency of the electrochromic material 16 can be varied and set at any desired state between the two limits, so, for example, enough light can be admitted to be able to see through the modulating assembly while minimizing the amount of energy transmitted.

The modulating assembly 10 of the present invention can be used in windows of commercial and institutional buildings,.automobile glass, airplane and aerospace applications, sunglasses, and protection of solar concentrators.

Therefore, the usefulness of the modulating assembly 10 of the present invention is that the modulating assembly 10 reduces air conditioning costs, glare and UV damage while increasing comfort and thus, productivity of the persons inside the building. Furthermore, the modulating assembly 10 of the present invention is a self-powered system requiring no external electrical wiring. Irradiation sensors are not required. Continuously variable transmission is also available.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements, which are disclosed herein.

We claim:

1. A self-powered photoelectrochemical-electrochromic device that automatically modulates transmittance of incoming light without an external power source the device comprising:

a first transparent electrode;

a second transparent electrode disposed in parallel, spaced relation to said first electrode, the first transparent electrode being electrically connected to said second transparent electrode;

a layer of electrochromic material applied to said first transparent electrode;

a nanoporous semiconductor film applied to said second transparent electrode; said nanoporous semiconductor film having adsorbed therein a light absorbing dye; said absorbing dye enhancing the absorption of light in a specific spectral range; and electrolyte means of a selected thickness to provide lateral ionic conductivity that darkens an entire immediately adjacent layer of electrochromic material when light strikes any portion of the electrolyte means deposited between and contacting said electrochromic material layer and said nanoporous semiconductor dye adsorbed film, the electrolyte means having a redox couple such that upon application of light, the dye is illuminated by the absorption of light and said redox couple oxidizes to produce an electric field across the device which modulates effective light transmittance in said electrochromic material, said device and electrochromic material spontaneously bleaching upon removal of the light as a result of illuminated oxidized dye causing a chemically reversible oxidation on ions in said electrolyte means.

2. The device of claim 1 and further comprising a first transparent substrate and a second transparent substrate, the first transparent electrode being applied to the first transparent substrate, the second transparent electrode being applied to the second transparent substrate.

3. The device of claim 2, wherein the first and second transparent substrates comprise a material selected from the group consisting of glass and plastic.

4. The device of claim 1 wherein the electrochromic material is selected from the group consisting of $WO_3$, $IrO_x$, $V_2O_5$, and $NiO$.

5. The device of claim 1 wherein the semiconductor film comprises a metal oxide or metal sulfide selected from the group consisting of $TiO_2$, $CdS$, $ZnS$, $ZnO$, and $WO_3$.

6. The device of claim 1 wherein a dye substance enhances the absorption of light in a specific spectral range.

7. The device of claim 6 wherein the dye substance comprises transition metal complexes selected from the group consisting of $ML_3$ and $ML_2X_2$, wherein M is selected from the group consisting of Fe, Ru, Os, CR, Mo and Mn, wherein L comprises bipyridinetype ligand selected from the group consisting of 2,2'-bipyridine-4,4'-dicarboxylic acid and 4,4'-dimethyl-s-2'-bipyridine, and wherein X comprises monodentate ligand selected from the group consisting of CN, SCN, Cl, Br, I and $H_2O$.

8. The device of claim 6 wherein the dye substance is selected form the group consisting of poryphyrins, perylenes, phthalocyanines and RHODAMINES.

9. The device of claim 1 wherein the electrolyte means includes Li ions.

10. The device of claims 1 wherein said electrolyte means is selected from the group consisting of a liquid, a polymer and an ionic solid.

11. A self-powered photoelectrochemical-electrochromic device that automatically modulates transmittance of incoming light without an external power source, the device comprising:

a first transparent electrode;

a second transparent electrode disposed in a parallel, spaced relation to said first electrode, the first transparent electrode being electrically connected to said second transparent electrode;

a layer of electrochromic material applied to said first transparent electrode;

a nanoporous semiconductor film applied to said second transparent electrode; said nanoporous semiconductor film having adsorbed therein a light absorbing dye; said absorbing dye enhancing the absorption of light in a specific spectral range; and electrolyte means of a selected thickness to provide lateral ionic conductivity such that images are storable within the device when light strikes the electrolyte means deposited between and contacting said electrochromic material layer and said nanoporous semiconductor dye adsorbed film, the electrolyte means having a redox couple such that upon application of light, the dye is illuminated by the absorption of light and said redox couple oxidizes to produce an electric field across the device which modulates the effective light transmittance in said electrochromic material, said device and electrochromic material spontaneously bleaching upon removal of the light as a result of illuminated oxidized dye causing a chemically reversible oxidation of ions in said electrolyte means.

12. A method of modulating the transmittance of light comprising:

electrically connecting a first transparent electrode and a second transparent electrode in parallel, spaced relation to each other;

applying an electrochromic material to the first transparent electrode;

applying a nanoporous semiconductor film to the second transparent electrode;

said nanoporous semiconductor film having adsorbed therein a light absorbing dye that enhances absorption of light in a specific spectral range;

positioning an electrolyte layer between the electrochromic material and the nanoporous semiconductor film, the electrolyte layer having a redox couple, whereby the first and second electrodes, the electrochromic material, the nanoporous semiconductor film, and the electrolyte layer form a photoelectrochemical-electrochromic device; and exposing the photoelectrochemical-electrochromic device to a light source wherein the dye in the nanoporous semiconductor film absorbs the light and the redox couple oxidizes producing an electric field across the photo-electrochemical-electrochromic device to vary the effective light transmittance through the photoelectrochemical-electrochromic device.

13. The method of claim 12 further comprising applying the first transparent electrode to a first transparent substrate and applying the second transparent electrode to a second transparent substrate.

14. The method of claim 12 wherein the dye comprises transition metal complexes.

15. The method of claim 12 wherein the electrolyte layer has a predetermined thickness to provide high lateral ionic conductance.

* * * * *